United States Patent
Reichard et al.

(10) Patent No.: US 10,114,349 B2
(45) Date of Patent: Oct. 30, 2018

(54) MULTIPLE APPLICATIONS UTILIZED IN AN INDUSTRIAL AUTOMATION SYSTEM DISPLAYED AS A SINGLE APPLICATION

(71) Applicant: Rockwell Automation Technologies, Inc., Mayfield Heights, OH (US)

(72) Inventors: Douglas J. Reichard, Fairview Park, OH (US); Juergen Weinhofer, Chagrin Falls, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 378 days.

(21) Appl. No.: 13/863,192

(22) Filed: Apr. 15, 2013

(65) Prior Publication Data

US 2013/0297050 A1    Nov. 7, 2013

Related U.S. Application Data

(60) Provisional application No. 61/624,833, filed on Apr. 16, 2012.

(51) Int. Cl.
| | |
|---|---|
| *G05B 15/02* | (2006.01) |
| *G06F 3/0481* | (2013.01) |
| *G06F 17/30* | (2006.01) |
| *G06F 9/451* | (2018.01) |
| *G06F 9/44* | (2018.01) |

(52) U.S. Cl.
CPC .......... *G05B 15/02* (2013.01); *G06F 3/0481* (2013.01); *G06F 9/4443* (2013.01); *G06F 9/451* (2018.02); *G06F 17/30327* (2013.01)

(58) Field of Classification Search
CPC . G05B 15/02; G06F 9/4443; G06F 17/30327; G06F 3/0481

USPC ............................................................. 700/83
See application file for complete search history.

(56) References Cited

U.S. PATENT DOCUMENTS

| | | | |
|---|---|---|---|
| 7,165,226 B2 | 1/2007 | Thurner et al. | |
| 7,337,409 B2 | 2/2008 | Doblmayr et al. | |
| 7,526,794 B2 | 4/2009 | Chand et al. | |
| 2003/0028269 A1* | 2/2003 | Spriggs ................ | G05B 15/02 700/83 |
| 2003/0132962 A1* | 7/2003 | Santori et al. ............... | 345/762 |
| 2006/0004785 A1* | 1/2006 | Hinegardner ..... | G06F 17/30884 |
| 2006/0236328 A1* | 10/2006 | DeWitt ........................ | 719/329 |

(Continued)

OTHER PUBLICATIONS

Notice of Allowance for U.S. Appl. No. 13/863,166, dated Sep. 24, 2015, 10 pages.

(Continued)

*Primary Examiner* — Thomas C Lee
*Assistant Examiner* — Alan Chu
(74) *Attorney, Agent, or Firm* — Amin, Turocy & Watson, LLP

(57) ABSTRACT

A manager (or master) application can facilitate navigation between different slave applications used in connection with an industrial automation system and manipulation of the different applications. For example, the manager application can at least: display the first application and the second application at different organizational locations within the manager application and provide a common menu to the first application and the second application. According to an input to the common menu, a variety of actions can be performed by the first application or the second application.

20 Claims, 16 Drawing Sheets

(56) References Cited

U.S. PATENT DOCUMENTS

2007/0211079 A1\* 9/2007 Nixon ................ G05B 19/0426
 345/619
2008/0163104 A1\* 7/2008 Haug ............................ 715/788
2009/0204646 A1\* 8/2009 Park .................. G06F 17/30126
2009/0222513 A1\* 9/2009 Sallberg ........................ 709/203
2011/0258568 A1\* 10/2011 Pandurangan et al. ....... 715/771

OTHER PUBLICATIONS

Office Action dated May 1, 2015 for U.S. Appl. No. 13/863,166, 16 pages.

\* cited by examiner

MULTIPLE APPLICATIONS UTILIZED IN AN INDUSTRIAL AUTOMATION SYSTEM DISPLAYED AS A SINGLE APPLICATION

CROSS REFERENCE TO RELATED CASES

This application claims priority to U.S. provisional application No. 61/624,833, filed on Apr. 16, 2012, entitled "CONTROL AND VISUALIZATION SYSTEM DESIGN EDITOR WITH ENHANCED VISUALIZATION MODES." Additionally, this application is related to concurrently filed U.S. application Ser. No. 13/863,166, filed Apr. 15, 2013, entitled "MAPPING BETWEEN HIERARCHIES IN AN INDUSTRIAL AUTOMATION SYSTEM" now U.S. Pat. No. 9,239,573, issued Jan. 19, 2016. The entireties of these two applications are incorporated herein by reference.

TECHNICAL FIELD

This disclosure generally relates to a master application that can facilitate navigation between different slave applications and manipulation of the different slave applications via a common menu.

BACKGROUND

Industrial automation generally refers to the use of control systems to increase the productivity and/or quality of an industrial process. An "industrial process" generally refers to any type of process that facilitates the production of goods or the delivery of services. A "control system" generally refers to a device or set of devices that manage, command, direct, or regulate the behavior of other devices utilized within an industrial process. The "control system" can be managed by an "industrial controller," such as a programmable logic controller, a programmable automation controller, or the like.

Different software applications or programs can be utilized to design a component of the control system related to one or more devices. The component of the control system requires at least two separate programs to facilitate a complete design. The two programs can include, for example, a control program and a visualization program. The control program can run on an industrial controller, such as a programmable logic controller or a programmable automation controller, to control the operation of the component. The visualization program can define a screen for an operator panel corresponding to the component. Traditionally, the separate programs used to configure the component, such as the control program and the visualization program, have been separate programs with separate navigation and manipulation/editing functionalities. The separate functionalities inherent to the separate programs complicate the component design process.

The above-described background is merely intended to provide an overview of contextual information regarding the design of a component in a control system, and is not intended to be exhaustive. Additional context may become apparent upon review of one or more of the various non-limiting embodiments of the following detailed description.

SUMMARY

The following presents a simplified summary to provide a basic understanding of some aspects of the subject disclosure. This summary is not an extensive overview of the disclosed subject matter. It is not intended to identify key or critical elements of the disclosed subject matter, nor is it intended to delineate the scope of the subject disclosure or the claims. Its sole purpose is to present some concepts of the disclosed subject matter in a simplified form as a prelude to the more detailed description presented later.

A master application is described herein that can facilitate navigation and manipulation of two different slave applications via a common menu. The slave applications can be any application utilized in an industrial automation system. For example, the slave applications can be visualization applications and/or control applications. In fact, the slave applications can be entirely different applications or different instances of different versions of the same application.

In a non-limiting embodiment of the subject disclosure, a system is described that can facilitate navigation between two different applications and manipulation/editing of the two different applications via a common menu. The system includes memory that stores instructions and a processor that executes or facilitates execution of the instructions. Upon execution, the instructions can cause the system to at least: display a manager application comprising a display of a first application utilized in configuration of an industrial automation system at a first organizational location within the manager application and a display of a second application utilized in the configuration of the industrial automation system at a second organizational location within the manager application and provide a common menu to the first application and the second application via the manager application.

In another non-limiting embodiment, a method is described that can between two different slave applications and manipulation/editing of the two different slave applications via a common menu of a master application. The method includes, displaying, by a system comprising a processor, a main application comprising a first application utilized in configuration of an industrial automation system at a first position within a main application and a second application utilized in configuration of the industrial automation system comprising a second application at a second position within the main application and receiving, by the system, a selection from a common menu in a master application, and facilitating, by the system, performance of an action by the first slave application or the second slave application in response to the input. The first slave application and the second slave application are different applications utilized in configuration of an industrial automation system.

In a further non-limiting embodiment, a computer-readable storage medium is described. The computer-readable storage medium has computer-executable instructions stored thereon that, in response to execution by a computing device comprising a processor, cause a computing device to perform operations. The operations include: displaying a main application comprising a first application utilized within an industrial automation system at a first position within the main application and a second application utilized within an industrial automation system at a second position within the main application, receiving a selection of a command from a common menu for the first application and the second application within the main application, and facilitating performance of an action by the first application or the second application in response to the selection.

The following description and the annexed drawings set forth in detail certain illustrative aspects of the disclosed subject matter. These aspects are indicative, however, of a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

In the following description, numerous specific details are set forth to provide a thorough understanding of the embodiments of the subject disclosure. One skilled in the relevant art will recognize, however, that the embodiments described herein can be practiced without one or more of the specific details, or with other methods, components, materials, etc. In other instances, well-known structures, materials, or operations are not shown or described in detail to avoid obscuring certain aspects.

According to an aspect of the subject disclosure, described herein is a master application that can facilitate navigation between different slave applications and manipulation of the different slave applications via a common menu to facilitate design of an industrial automation system. For example, the master application can facilitate the design of a control program and a corresponding visualization with the control design program and the visualization design program appearing as a single application via the master application. The various slave programs can be any program that leads to configuration or recording of an entity or an aspect of the control system or underlying industrial process.

When used herein, the term "industrial automation system" generally refers to any system that can be used to facilitate automation of an industrial process. An industrial automation system can also be referred to as an "industrial automation environment" or any similar terms. The industrial automation system includes one or more "control systems" that can control an entity or a process within the industrial automation systems. The control systems can employ one or more "industrial controllers" to control the entity or the process. An industrial controller is a device that includes a memory and a processor and can facilitate control of the entity or the process. Examples of industrial controllers include programmable logic controllers, programmable automation controllers, or any other hardware machine that can facilitate industrial control. An "entity" within an industrial automation system generally refers to any hardware device, part of a hardware device, or combination of hardware devices that can be utilized as part of an industrial process.

The master application (also referred to interchangeably as a "manager application," a "main application," a "shell application," or a "lens application") can facilitate a display of programs or data from other applications (or "slave applications"). Using the master application, the slave applications can appear as though they are part of a single application (the master application, the manager application or the main application). In other words, the master application can provide a "lens" to the slave applications, making the slave applications easier to use in the design of an industrial automation system.

Figure 1:
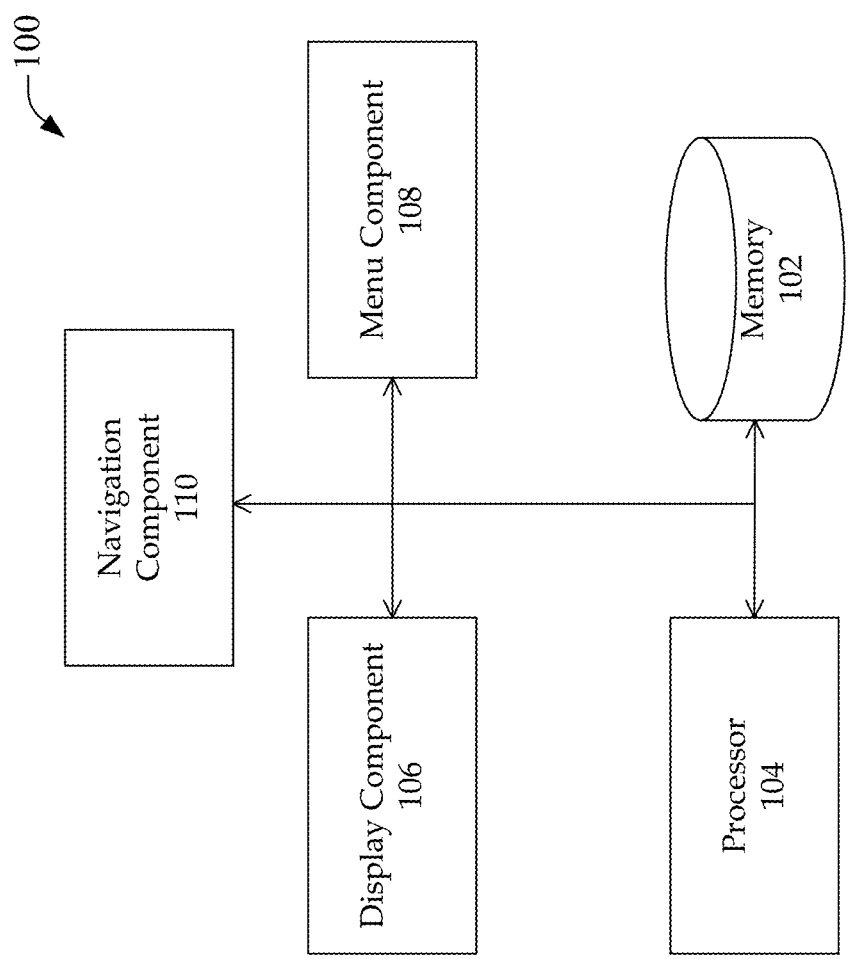
FIG. 1 is a schematic illustration of a system employing a master application to facilitate the display slave applications appearing as a single application, according to an embodiment of the subject disclosure.

Referring now to FIG. 1, illustrated is a system 100 employing a master (or manager, main or the like) application to facilitate the display slave applications appearing as a single application, according to an embodiment of the subject disclosure. System 100 can be utilized to facilitate the design of an industrial automation system. For example, the slave applications can be applications utilized in the design of the industrial automation system, such as control applications and display/visualization applications. System 100 can facilitate the design of the industrial automation system via both runtime/touch devices and traditional desktop devices that utilize a mouse and a keyboard due to the single interface. Examples of runtime/touch devices include tablet computers, smart phones, panel devices, and the like.

System 100 includes a memory 102 that can store instructions, components, or the like. System 100 also includes a processor 104 that can execute or facilitate execution of the instructions, components, or the like to facilitate the performance of various operations associated with the instructions, components, or the like. The memory 102 and the processor 104 are both hardware devices that can be utilized within an industrial automation system. Memory 102 and processor 104 can be part of a single device within the industrial automation system or distributed through different devices within the industrial automation system.

The memory 102 can store various components, that can be executed or whose execution can be facilitated by the processor 104. The components include at least a display component 106, a menu component 108, and a navigation component 110.

This display component can display a manager application comprising a display of a first application. In other words, the manager application can provide a lens for the first application and the second application so that the first application and the second application appear as a single application (the manager application). It will be understood that the display component can display more than two applications. Two applications are utilized for simplicity of illustration and explanation. The number of applications that can be utilized/displayed within the manager application is limited only by processor and display capabilities of a device associated with system 100.

The manager application can facilitate the display of files of a first format linked with the first application and a second format linked to the second application. The first application and the second application can be any two applications that produce files of different formats. The applications can be distinctly different applications or different versions of the same application. In an embodiment, the applications can be utilized in the configuration of an industrial automation system. One aspect of an industrial automation system that can be configured is a component (device, combination of devices, or a portion of an industrial process) of a control system within the industrial automation system. The component of the control system can be one of many components within the industrial automation system. For example, the industrial automation system can include a plurality of industrial controllers, corresponding plurality of control systems, and a plurality of panel displays.

Examples of programs that can be utilized in the configuration of the component of the control system are control programs and visualization programs. Control programs can define control logic that runs on an industrial controller. Visualization programs can facilitate the design of a human/machine interface that can be displayed on a panel display within the industrial automation system.

Within the manager application, the first application and the second application can be two different applications utilized in configuration of an industrial automation system. In an embodiment, one of the applications can be a control program and the other application can be a visualization program. In another embodiment, the first application and the second application can be different versions of the same application. In a case where the manager component 106 comprises three applications, the three applications can be any combination of three different applications, two different applications and one different version of one of the applications, three different versions of the same application, or any other combination. In other words, the three applications can be any type of application utilized in the design of an industrial automation system.

The manager application can allow any files related to the first program and the second program of any format to be displayed together under the shell or lens of the manager application. For example, the files related to the first program and files related to the second program can both be related to the same project. The manager application allows these files to be displayed, navigated between, manipulated and/or edited within a single application. In other words, the manager application can facilitate display, maneuvering, navigation, manipulation, editing, mapping, or the like between the two file formats.

The manager component 106 can facilitate the display of the first application at a first organizational location within the manager application and the second application utilized in the configuration of the industrial automation system at a second organizational location within the manager application. In an embodiment, the manager component 106 can provide the manager application with a tabbed document interface where the first application and the second application are linked to different tabs. The first tab corresponds to the first organizational location and the second tab corresponds to a second organizational location.

The menu component 108 can provide a common menu within the manager application to the first application and the second application. The menu component 108 can receive an input of a selection from the common menu and facilitate performance of an action by the first application or the second application in response to the input.

The common menu can include any functionality that both the first application and the second application share. In an embodiment, the common menu includes a common save command for the first application and the second application. In a further embodiment, the common menu includes various menus that can be pulled down into more detailed options. For example, the common menu can provide a common file menu for the first application and the second application, a common view menu for the first application and the second application or a common tools menu for the first application and the second application. The common menu can provide any type of menus or commands that can facilitate use of the different applications as a single application.

The navigation component 110 can facilitate navigation between the first application and the second application within the manager application. The individual applications within the manager component can each have their own menus to perform functions unique to the different applications. Navigating between the applications with the navigation component 110 is similar to navigating between applications on a traditional computer taskbar. Navigating to one of the different applications brings the application to be more prominently displayed within the manager application with access to traditional menus for the individual application. The menus for the single application, in an embodiment, can include functionalities not included in the common menu.

In an embodiment, the manager application can be a tool that can manage an industrial automation system as a whole. In other words, the manager application can be a system editor that can manage multiple control projects and multiple visualization projects via a plurality of different system level views between which the navigation component 110 can facilitate navigation between. Accordingly, the navigation component 110 can facilitate navigation between the different applications and between the different system level views of the applications or within the applications.

The navigation component 110 can be a process manager that can manage the windows, instances or tabs of multiple processes or applications. Such a process manager can provide the feel of a single application when there are multiple applications running. The process manager can have multiple navigation views and tabs that manage multiple windows from multiple processes.

The manager application can be built in any computer language or combination of computer languages that can facilitate the reuse of the manager application for different first applications and/or different second applications. The re-usable manager application can provide the common menu and the navigation capabilities to other applications with different purposes with either no editing of the manager application or minimal editing of the manager application. One example of such a computer language is HTML (hypertext markup language).

System 100 can facilitate the implementation of the master application on various devices. The various devices can include tablet computers, smart phones, laptop computers, panel devices, desktop computers, or the like. The navigation component 110 provides navigational aspects that fit especially well on a tablet computer, a smart phone, or a panel device. The display component 106 can provide different viewer capabilities for different data provided by the different applications within the manager application. The menu component 108 can provide at least some ability for form based configuration of the industrial automation system.

Figure 2:
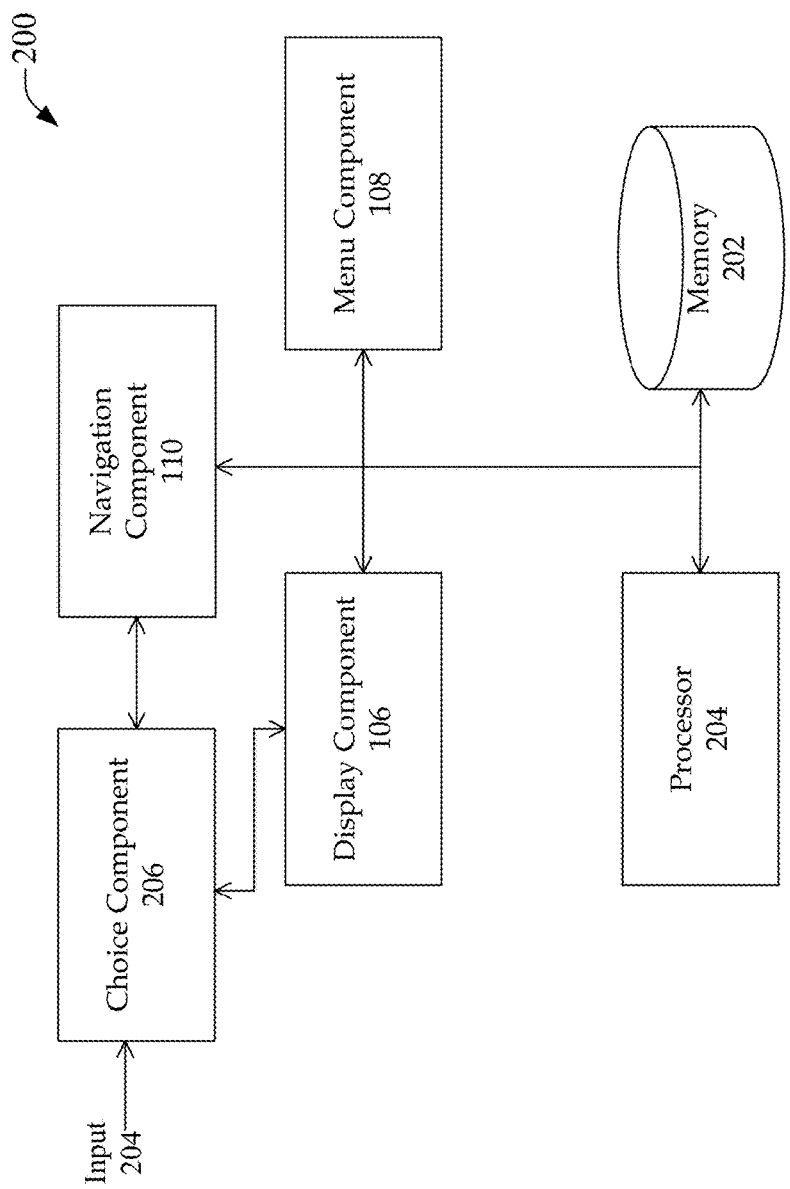
FIG. 2 is a schematic illustration of a system employing a master application to facilitate navigation between slave applications, according to an embodiment of the subject disclosure.

Referring now to FIG. 2, illustrated is a system 200 employing a master (or manager, main or the like) application to facilitate navigation between slave applications, according to an embodiment of the subject disclosure. The manager application is a third application that houses system data and views associated with the different slave applications. The manager application also acts as a window manager, managing the windows of the slave applications (e.g., different slave applications, different instances of the slave applications, different versions of the slave applications, etc.).

System 200 includes a memory 202 that can store instructions, components, or the like. System 200 also includes a processor 204 that can execute or facilitate execution of the instructions, components, or the like to facilitate the performance of various operations associated with the instructions, components, or the like. The memory 202 and the processor 204 are both hardware devices that can be utilized within an industrial automation system. Memory 202 and processor 204 can be part of a single device within the industrial automation system or distributed through different devices within the industrial automation system.

The memory 202 can store various components, that can be executed or whose execution can be facilitated by the processor 204. The components include at least a display component 106, a menu component 108, a navigation component 110, and a choice component 206. The display component 106, the menu component 108 and the navigation component 110 generally have the functionalities described above.

The choice component 206 can facilitate the navigation by the navigation component. The choice component 206 can receive an input 204 selecting one of the slave applications from the display of the master application (displayed by the display component 106). Based on the input, the choice component 206 can facilitate the display of the selected slave application via the display component 106.

The display component 106 can display the selected slave application in any way that emphasizes the selected slave application and de-emphasizes the non-selected slave application. In the case where the different slave applications are displayed in a tabbed document interface, with each slave application corresponding to a different tab, the choice component 206 can receive an input 204 of a selection of a tab corresponding to the selected slave application. The display component 106 can facilitate a display of the selected tab and make the display of the non-selected tab.

The navigation component 110 can also facilitate navigation between different views of the individual slave application. For example, the navigation can be between logical views, physical views, library views, and other views. In other words, the navigation component 110 can facilitate navigation between any types of views that can facilitate actions by the slave application. The navigation component 110 can also facilitate addition of content to the manager application or to the various slave applications. For example, an additional slave application can be opened within the manager application via the navigation component 110. Also for example, content can be added to either of the slave applications from a library to facilitate programming for an industrial automation system via one or more of the slave applications.

The views can, for example, refer to any number of different hierarchies (also referred to as hierarchical trees, tree structures, organizational hierarchies, or similar terms) utilized within the industrial automation system. The hierarchies provide a high level view of the organization of different data and information within the industrial automation system. Hierarchies can reference data or information from one part of the industrial automation system to another.

Generally, hierarchies are utilized within the industrial automation system to facilitate discovery of data or information utilized in the design of one or more components of the industrial automation system. In an example, the industrial automation system can organize data or information related to any aspect of the industrial process in any number of organizational hierarchies. The organizational hierarchies can simplify the design of components of the industrial automation system. Common examples of organizational hierarchies utilized within an industrial automation system include a logical hierarchy, a physical hierarchy, a control hierarchy and a network hierarchy.

For example, a library hierarchy can be used to provide data or information that can be utilized to create various programs, visualizations, or the like used within the industrial automation system wherein the programs and visualizations are organized in a logical hierarchy. In another example, programs and visualizations that utilize data that is organized according to a logical hierarchy can be bound to a certain device, and this binding can be made in accordance with a physical hierarchy. As a further example, the programs and visualizations (both organized according to the logical hierarchy or bound to a device according to a physical hierarchy) can be stored within a library hierarchy to facilitate reuse. Additionally, in another example, data or information can be produced or consumed from a single hierarchy (such as a physical hierarchy). In other words, the instances of data in different hierarchies relate to the same data representing different namespaces.

Accordingly, system 200 can facilitate display of the industrial automation system according to the one or more hierarchies utilized within the industrial automation system. The navigation component 110 can facilitate navigation through the different hierarchies to navigate to a spot for manipulating content. The different hierarchies can provide a high level view of the location of the content or to reference or map content from one part of the industrial automation system to another. Examples of referencing or mapping that can be facilitated by the navigation component 110 include: library to logical create (intents) of programs/screen in a logical model, logical/physical binding programs/screen to a device, reusing logical or physical to library, producing or consuming physical to physical, or the like. When used herein, logical refers to a logical representation, physical refers to a hardware representation, and library refers to a stored, reusable representation.

The navigation component 110 can facilitate exploration of hierarchies. The navigation component 110, through an exploration of one or more hierarchies, allows various projects, areas, units, modules, models, programs, screens, or the like to be managed as a tree via the manager application. Through the tree, the navigation component 110 allows properties to be added, deleted, moved, edited, or the like. The navigation component 110 can further facilitate mapping of data between the different slave applications (e.g., via a drag and drop function with respect to the hierarchies).

Figure 3:
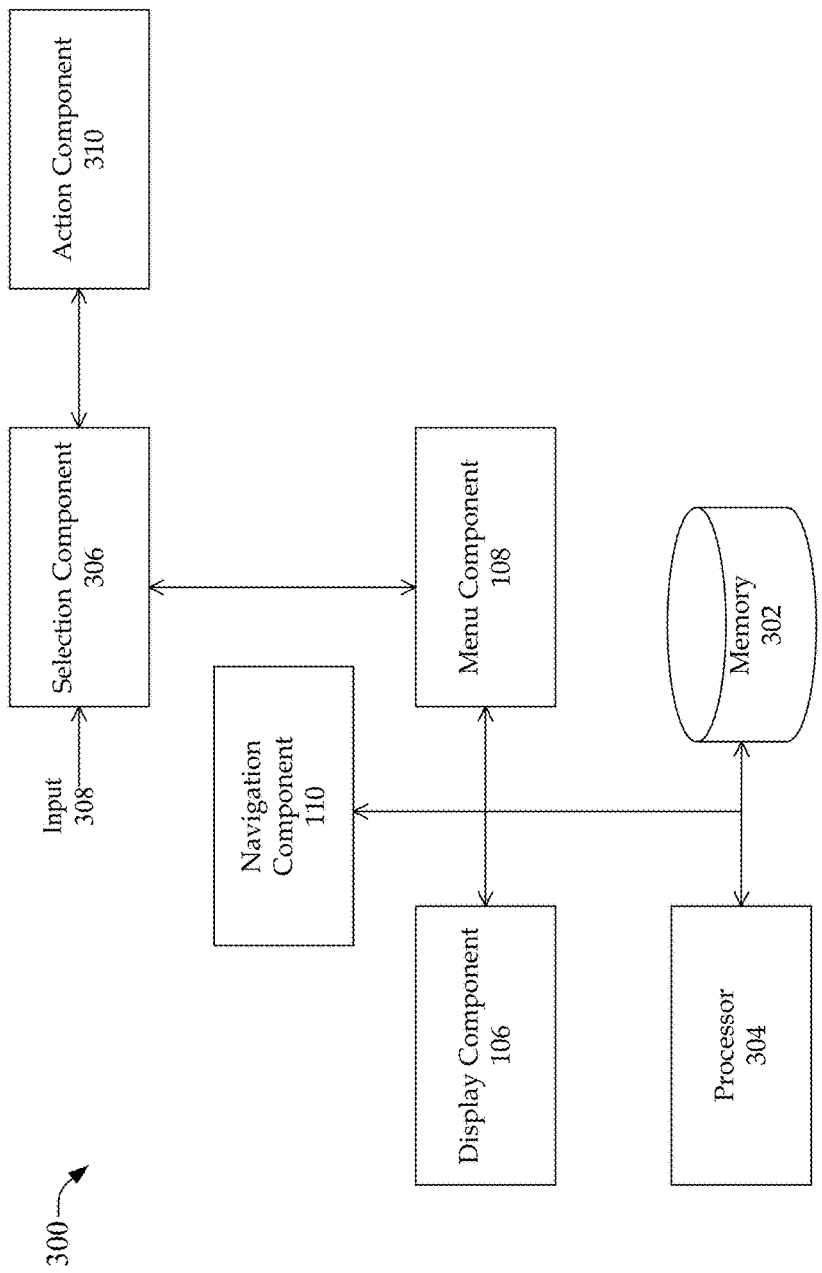
FIG. 3 is a schematic illustration of a system employing a master application that can display a common menu to slave applications so that the slave applications appear as a single application, according to an embodiment of the subject disclosure.

Referring now to FIG. 3, illustrated is a system 300 employing a master (or manager, main or the like) application that can display a common menu to slave applications so that the slave applications appear as a single application, according to an embodiment of the subject disclosure. The common menu can provide options common to both of the slave applications. The options can relate to navigation, configuration, system data, views, file options including saving, among other options shared in common between the slave applications that can facilitate the display of the slave applications within the manager application so that the slave applications appear as a single application.

System 300 includes a memory 302 that can store instructions, components, or the like. System 300 also includes a processor 304 that can execute or facilitate execution of the instructions, components, or the like to facilitate the performance of various operations associated with the instructions, components, or the like. The memory 302 and the processor 304 are both hardware devices that can be utilized within an industrial automation system. Memory 302 and processor 304 can be part of a single device within the industrial automation system or distributed through different devices within the industrial automation system.

The memory 302 can store various components, that can be executed or whose execution can be facilitated by the processor 304. The components include at least a display component 106, a menu component 108, a navigation component 110, a selection component 306 and an action component 306. The display component 106, the menu component 108 and the navigation component 110 generally have the functionalities described above.

The selection component 306 can receive an input 308 of a selection of one or more options from the common menu. The common menu includes actions through the manager application that are common to the different slave applications. One example of such a common action is a save action. The common menu can provide an option to save an instance of any of the slave applications (a "common save function"). The action component 310 can facilitate performance of the action on one or more of the slave applications. In an example, an input 308 selecting the common save function can allow the action component 310 to facilitate saving of individual instances of one of the slave applications, multiple instances of one of the slave applications, or instances of multiple slave applications. The action component 310 can facilitate the performance of actions within the slave applications. The application can relate to a selection from the common menu, an action between the slave application (e.g., copying from one slave application and pasting into another slave application), or any other action with respect to one or more of the slave applications.

The common menu can display options that can facilitate any of the functionalities of the slave applications through the master application. The common save function is just one of many possible actions that can be performed by the action component 310. Further examples of options that can be available through the common menu of the master application include, but are not limited to system navigation applications (for example, assisting the navigation component 110 facilitate the navigation between different system hierarchies), file menu applications, mapping applications, editing applications, smart button applications, applications that facilitate access to library content, toolbox applications, quick tool applications, applications that facilitate the creation of new projects or parts of projects. Basically, the common menu can allow one or more individual menus to be eliminated within the instances of the slave applications (e.g., eliminating individual file menus or edit menus).

FIGS. 4-10 show examples of a master application 402 (the manager application described above) that can facilitate both navigation between different slave applications and manipulation of the different slave applications via a common menu. The designs of the master application shown in FIGS. 4-10 can facilitate inputs from a touch screen or a traditional keyboard/mouse design. However, the designs of the master application 402 shown in FIGS. 4-10 are merely exemplary and by no means exclusive of different designs that can be utilized to accomplish the functions of systems 100-300.

Figure 4:
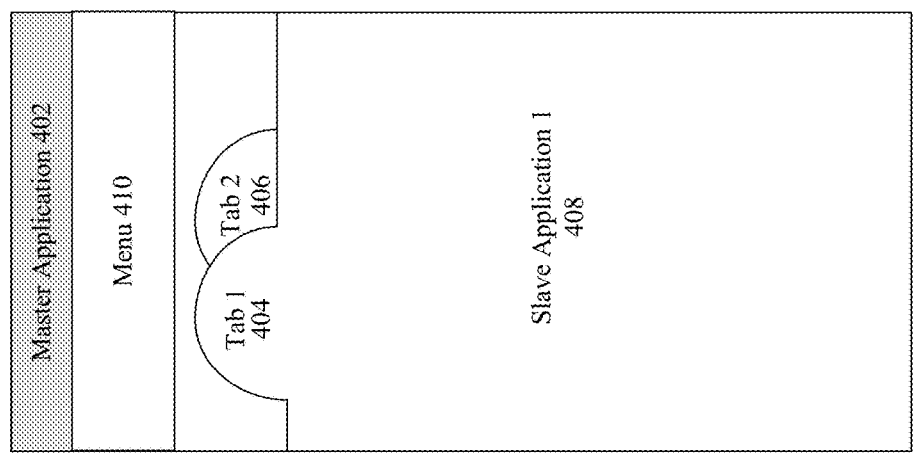
FIG. 4 is a schematic illustration of an example master application with tabs representing slave applications and a common menu, according to an embodiment of the subject disclosure.
Figure 5:
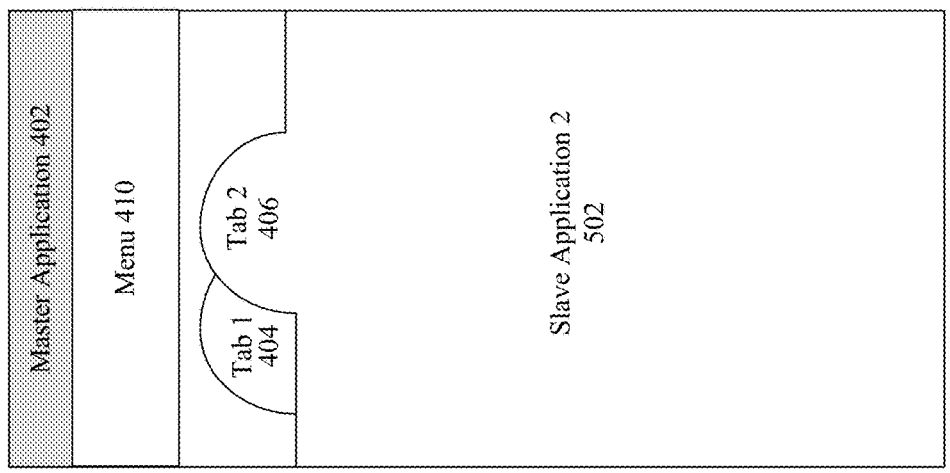
FIG. 5 is a schematic illustration of the master application with a different tab selected, according to an embodiment of the subject disclosure.

FIG. 4 is a schematic illustration of an example master application 402 (also referred to herein as a main application and a manager application) with tabs 404, 406 representing slave applications (e.g., application 408) and a common menu 410, according to an embodiment of the subject disclosure. FIG. 5 is another schematic illustration of the example master application 402 with a different tab selected to display a different slave application (e.g., application 502). The tabbed document interface as shown in FIGS. 4 and 5 is just one example of the way the slave applications can be displayed within the master application 402. The common menu 410 can facilitate common actions between the slave applications 408, 502. The tabs 404, 406 facilitate navigation between the slave applications (slave application 604 is displayed as selected). Each individual tab corresponds to a different slave application, different version of the slave application or different instance of a slave application.

For example, the slave applications can be an instance of a control program, an instance of a visualization program, and an instance of a library. In another example, the slave applications can be an instance of a first version of a control program, an instance of a second version of the control program, and an instance of the visualization program. Any combination of instances of the same program, instances of different versions of the same program, instances of different programs, or any other combination can be displayed within the master application 402.

Figure 7:
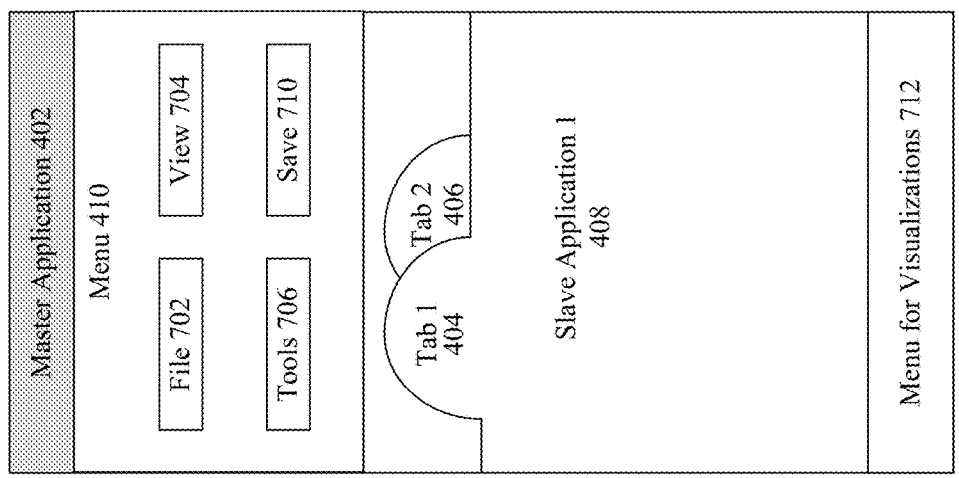
FIG. 7 is a schematic illustration of the common menu to the slave applications within the master application, according to an embodiment of the subject disclosure.

The common menu 410 is illustrated in more detail within FIG. 7. The common menu 410 can provide additional sub menus and functions to the slave applications that can perform the respective actions on either or both of the slave applications. The functions can include common functions, including a common save 710 function. Many other functions can be included in the common menu 410. The common sub menus can provide further common functions between the slave applications. The common sub menus can include, but are not limited to, a file 702 sub menu, a tools 706 sub menu, and a view 704 sub menu. The common menu 410 can also include a menu 712 that allows manipulation of different visualizations within the different slave applications.

Figure 6:
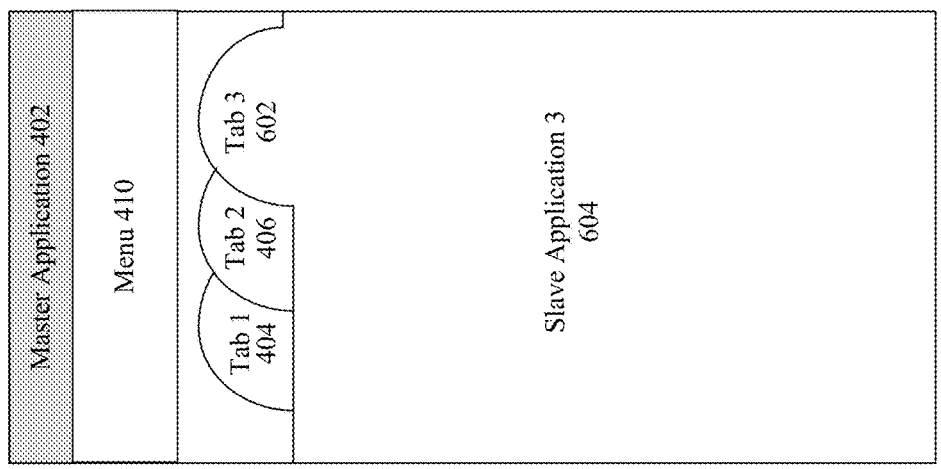
FIG. 6 is a schematic illustration of the master application with three slave applications, according to an embodiment of the subject disclosure.
Figure 8:
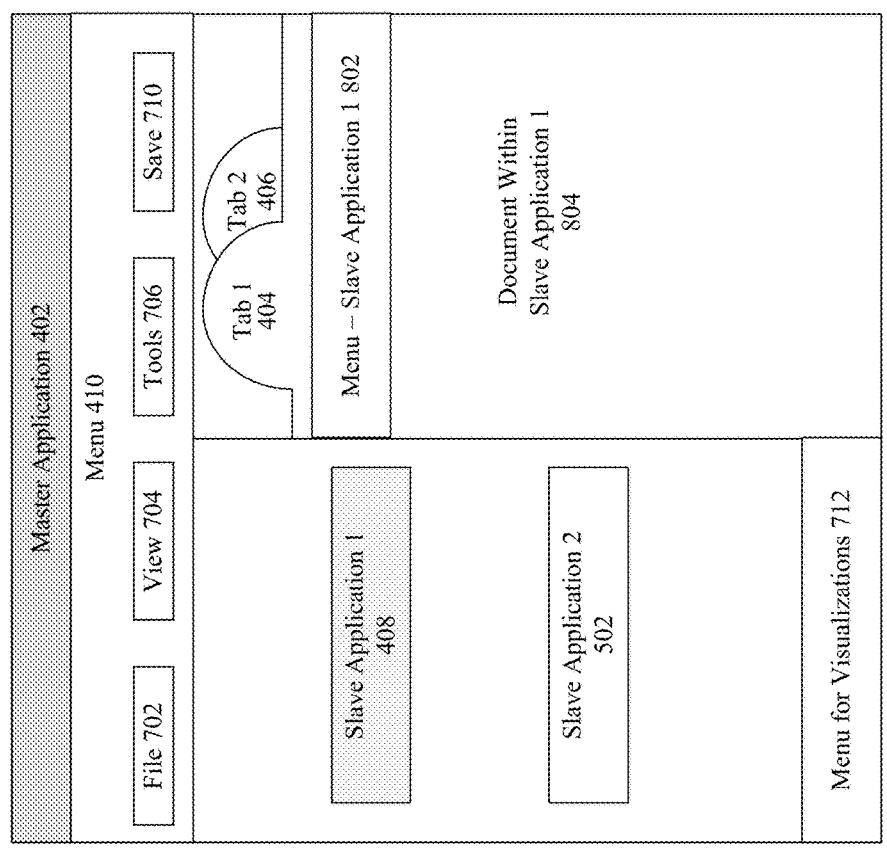
FIG. 8 is a schematic illustration of another example of the master application with tabs representing slave applications and a common menu, according to an embodiment of the subject disclosure.
Figure 9:
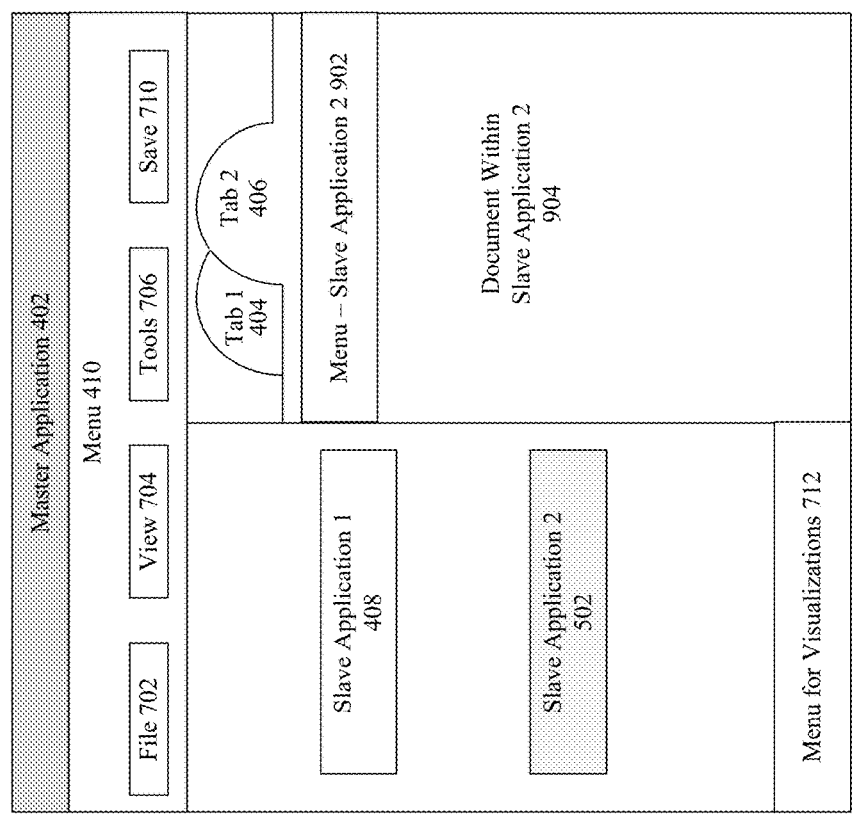
FIG. 9 is a schematic illustration of another example of the master application with a different tab selected, according to an embodiment of the subject disclosure.
Figure 10:
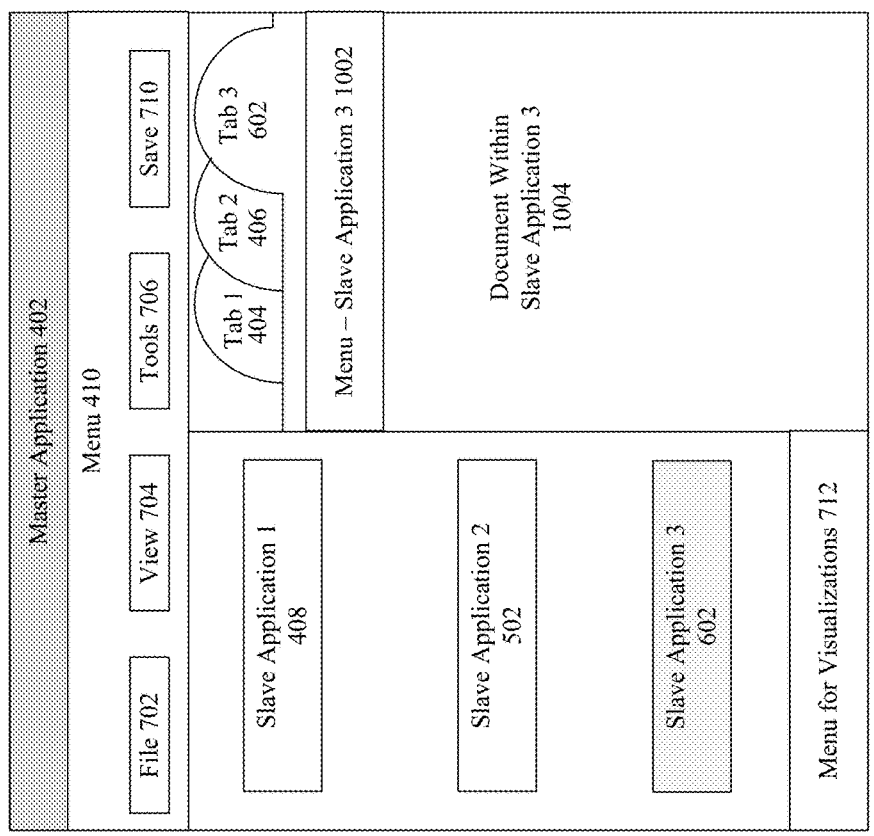
FIG. 10 is a schematic illustration of another example of the master application with three slave applications, according to an embodiment of the subject disclosure.

FIG. 8-10 are schematic illustrations of different organizations of the master (or manager or main) application 402. The examples shown in FIGS. 8-10, as well as FIGS. 4-6 are only meant to shown that the master application 402 can be displayed in different ways. The master application 402 can be organized in any possible display that shows the essential parts of the manager application, including an organization that facilitates navigation between the applications and the common menu 410.

FIGS. 11-14 show methods illustrated as flow diagrams, in accordance with one or more embodiments of the subject application. For simplicity of explanation, the methods are depicted and described as series of acts. However, the methods are not limited by the acts illustrated and by the order of the acts. For example, acts can occur in various orders and/or concurrently, and with other acts not presented and described herein. Furthermore, not all illustrated acts may be required to implement the methods. The acts of the methods can be performed by a system including a processor.

Additionally, it should be further appreciated that the methods can be implemented on one or more articles of manufacture (e.g., a non-transitory computer-readable storage medium having computer-executable instructions for performing the acts and/or events of the various methods stored thereon) to facilitate transporting and transferring the methods. Non-transitory computer readable media can include, but are not limited to, magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ), and the like. Further yet, two or more of methods can be implemented in combination with each other, to accomplish one or more features or advantages described herein.

Figure 11:
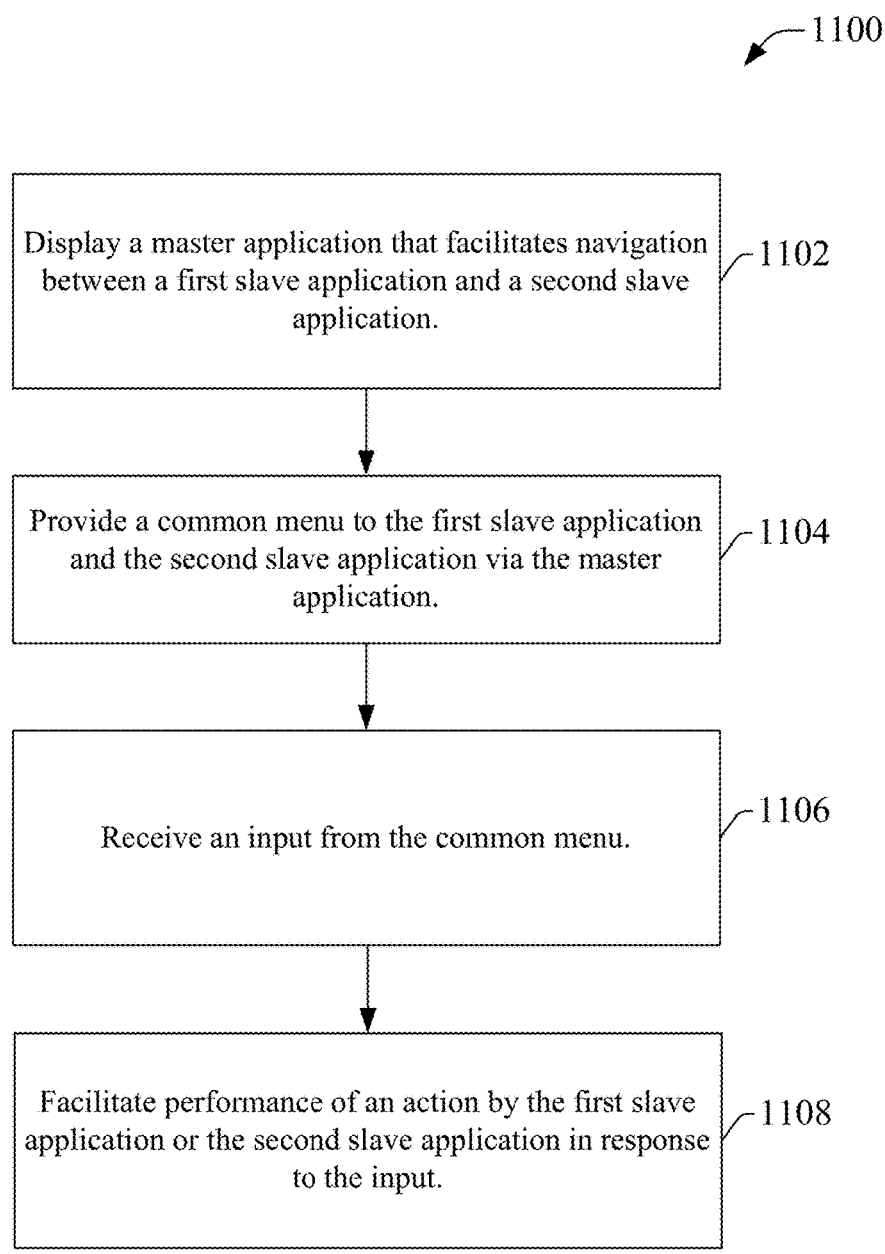
FIG. 11 is a process flow diagram illustrating a method that facilitates performance of an action by a slave application within a master application, according to an embodiment of the subject disclosure.

Referring now to FIG. 11, illustrated is a process flow diagram of a method 1100 that facilitates performance of an action by a slave application within a master application, according to an embodiment of the subject disclosure. At element 1102, a master application (or manager application or main application) can be displayed. The master application can include a first slave application utilized in configuration of an industrial automation system at a first position within the master application and a second slave application utilized in configuration of the industrial automation system at a second position within the master application. The slave applications can be different applications (entirely different applications, different instances of the same application or different versions of the same application). Examples of slave applications include a control program and a display/visualization program. The first position and the second position can correspond, for example, to tabs within a tabbed document interface.

At element 1104, a common menu to the first slave application and the second slave application can be displayed within the master application. The common menu can provide shared actions that can be undertaken by both of the slave applications. One action that can be shared by the slave applications includes a common save functionality that allows saving from one or both slave applications via the common menu. The actions can include a common view action and a common edit action. The master application can also facilitate navigation between the slave applications.

At element 1106, an input is received from the common menu (related to a common action that can be performed by one or both of the slave applications). At element 1108, in response to the input the associated action can be performed by one or both of the slave applications.

Figure 12:
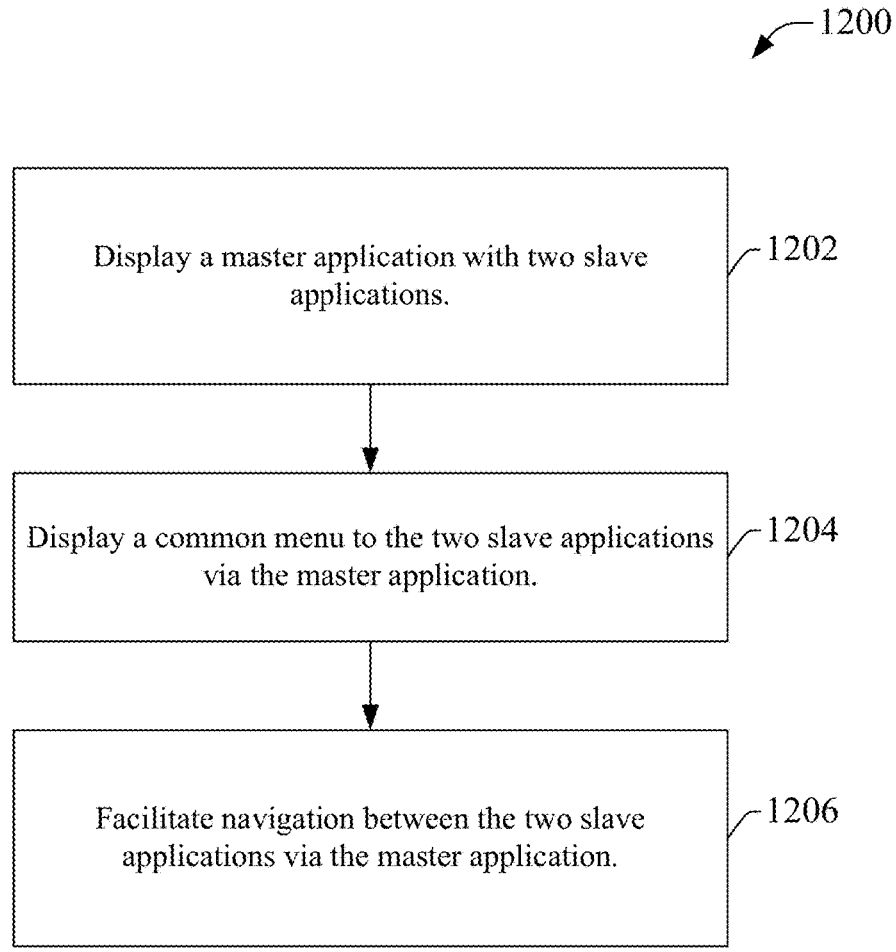
FIG. 12 is a process flow diagram illustrating a method that facilitates navigation between slave applications via a master application, according to an embodiment of the subject disclosure.

Referring now to FIG. 12, illustrated is a process flow diagram of a method 1200 that facilitates navigation between slave applications via a master (or manager or main) application, according to an embodiment of the subject disclosure. At element 1202, a master application can be displayed with two or more slave applications utilized within an industrial automation system. The slave applications are displayed at different organizational positions within the master application. At element 1204 the master application can provide a common menu to the slave applications. The common menu can facilitate performance of actions by one or both of the slave applications. The common menu can also reduce the displays of the slave applications by eliminating the need to display one or more menus within the slave applications. At element 1206, the master application can facilitate navigation between the slave applications. For example, the master application can provide a tabbed document interface that can facilitate selection of a tab that can correspond to a slave application. However, it will be understood that the master application can emphasize a selected slave application and de-emphasize the slave application in any other way.

Figure 13:
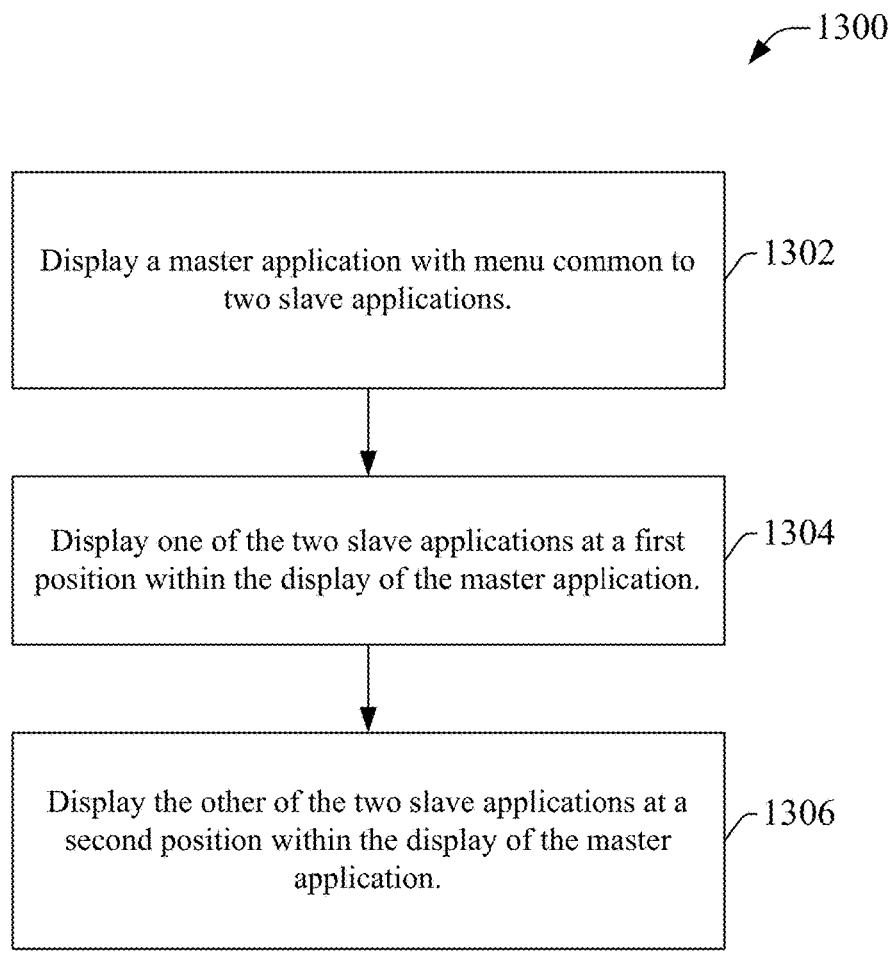
FIG. 13 is a process flow diagram illustrating a method that facilitates two slave applications appearing as part of a master application, according to an embodiment of the subject disclosure.

Referring now to FIG. 13, illustrated is a process flow diagram of a method 1300 that facilitates two slave applications appearing as part of a master application, according to an embodiment of the subject disclosure. At element 1302, a master application can be displayed with two or more slave applications utilized within an industrial automation system. The slave applications are displayed at different organizational positions within the master application. At element 1304 the first slave application can be displayed at a first position within the display of the master application. At element 1306 the second slave application can be displayed at a second position within the display of the master application. The different organizational positions facilitate navigation between the two or more slave applications. The different organizational positions can correspond to different tabs within a tabbed document interface. However, the organizational positions can be any different organizational positions that can facilitate navigation between the slave applications in the master application (e.g., different zoom levels, different fades, or any technique of emphasis or de-emphasis).

Figure 14:
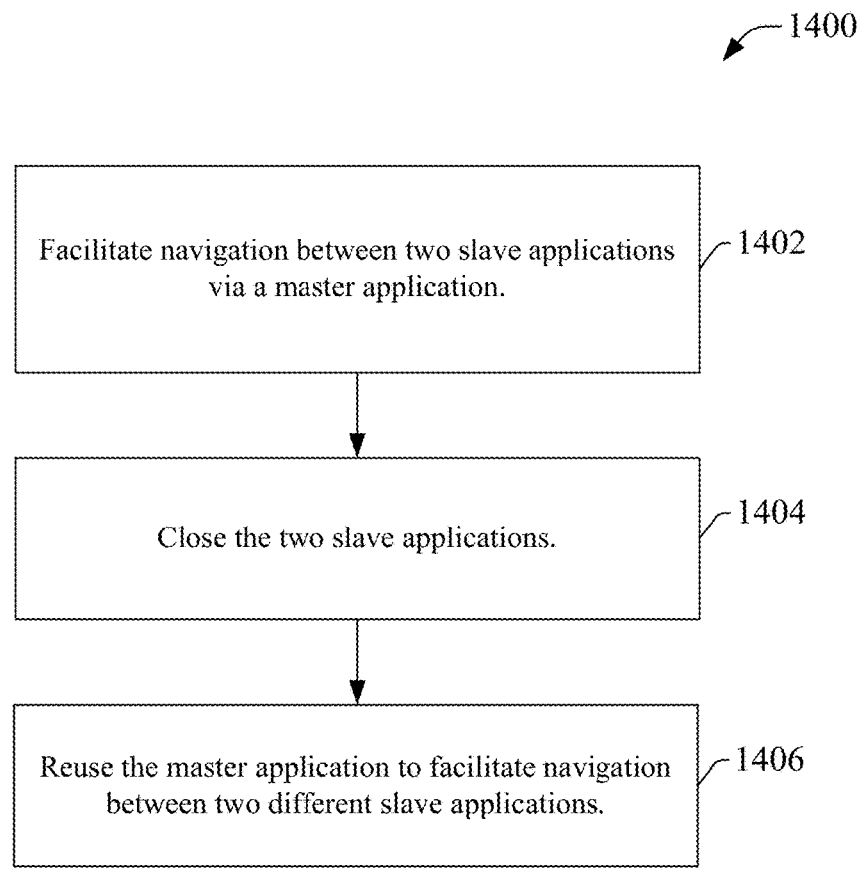
FIG. 14 is a process flow diagram illustrating a method that facilitates reuse of a master application for different slave applications, according to an embodiment of the subject disclosure.

Referring now to FIG. 14 is a process flow diagram of a method 1400 that facilitates reuse of a master application for different slave applications, according to an embodiment of the subject disclosure. At element 1402, the master application can facilitate navigation between two or more slave applications. At element 1404, one or more of the slave applications can be closed such that it is no longer displayed within the master application. At element 1406, the master application can be reused for different slave applications (or for different versions of the same slave applications).

Figure 15:
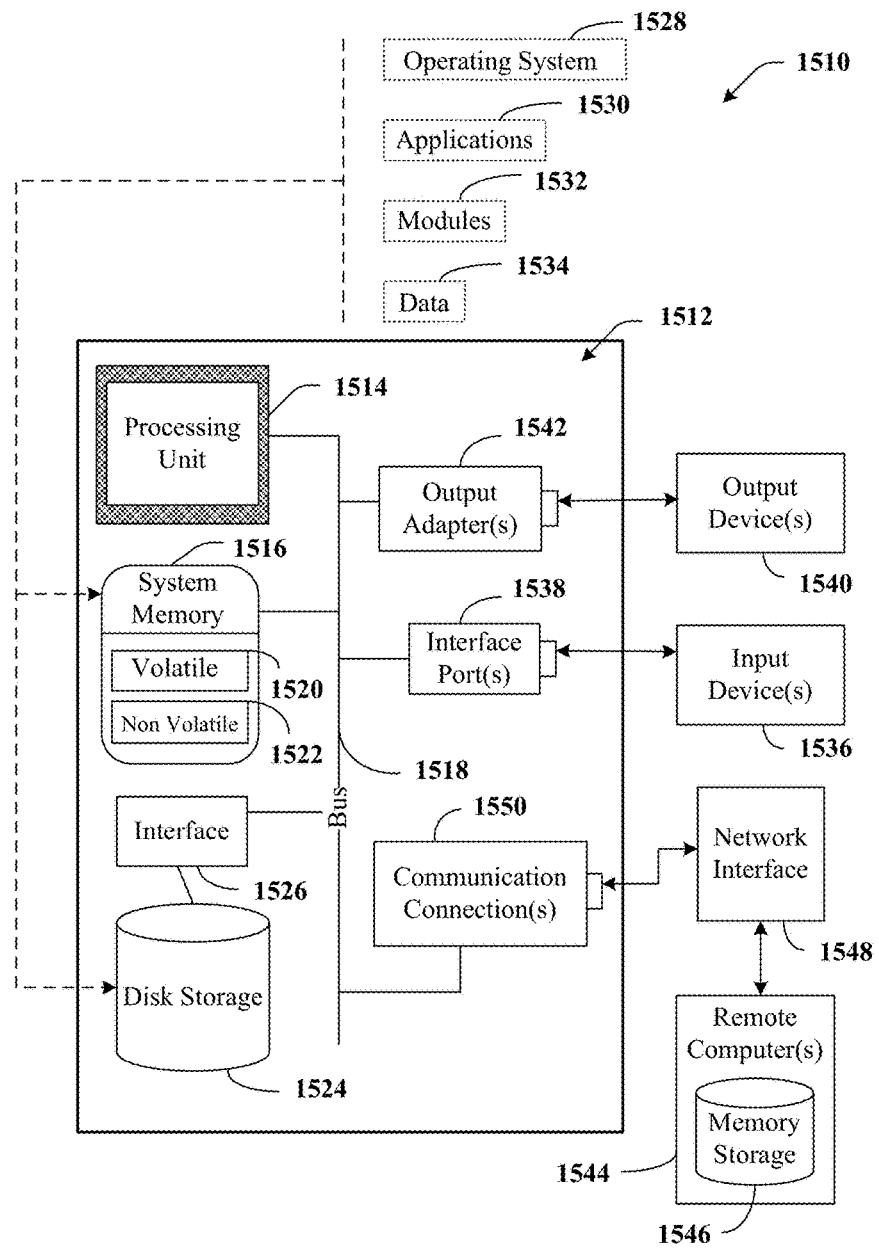
FIG. 15 illustrates an example computing environment in which any one of the various embodiments described herein can be implemented.
Figure 16:
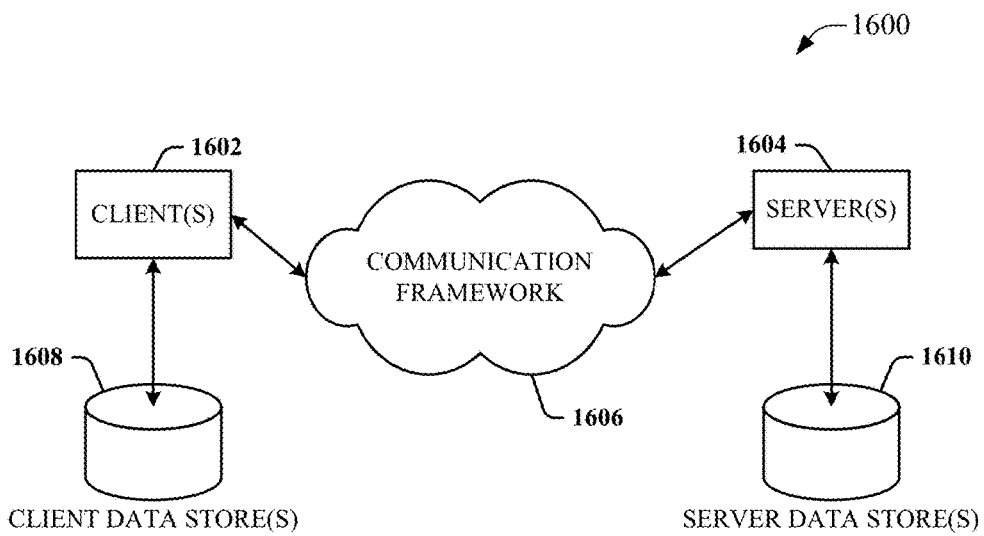
FIG. 16 illustrates an example of a computer network in which any one of the various embodiments described herein can be implemented.

In order to provide a context for the various aspects of the disclosed subject matter, FIGS. 15 and 16, as well as the following discussion, are intended to provide a brief, general description of a suitable environment in which the various aspects of the disclosed subject matter can be implemented. The master application and slave applications can be implemented within an industrial automation system to facilitate industrial automation applications (e.g., in the design or configuration of a control system within an industrial automation system).

Industrial automation systems, such as industrial control systems and industrial automation environments, in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on. As described herein, the applications and processes are generally discrete applications that execute on a single machine within an industrial automation system. However, the discrete applications can be distributed through the industrial automation system.

Similarly, the term programmable logic controller (PLC) or programmable automation controller (PAC) as used herein can include functionality that can be shared across multiple components, systems, and/or networks. As an example, one or more PLCs or PACs can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as Common Industrial Protocol (CIP) networks including Device-Net, ControlNet, and EtherNet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

With reference to FIG. 15, an example computing environment 1510 that can be utilized in an industrial automation system to facilitate implementing various aspects of the aforementioned subject matter. The environment 1510 includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Multi-core microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable PROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/non-removable, volatile/non-volatile computer storage media. FIG. 15 illustrates, for example a disk storage 1524. Disk storage 1524 generally includes any computer recording media that includes a recording media to retain digital data. Disk storage 1524 includes, but is not limited to, devices like a magnetic disk drive, floppy disk drive, tape drive, magnetic drive, Jaz drive, Zip drive, LS-100 drive, solid state semiconductor drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that one or more embodiments of the subject disclosure can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, a touch screen, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). It will be understood that some input devices do not connect through an interface port 1532. For example, the touch screen on a tablet device is directly connected to the processing unit 1514 and need not be connected through the interface port 1538.

Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Computer 1510 can also operate in a wireless network (e.g., WIFI).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, Ethernet cards and wireless modems and other wireless technologies.

FIG. 16 is a schematic block diagram of a sample-computing environment 1600 with which the disclosed subject matter can interact. The system 1600 includes one or more client(s) 1602. The client(s) 1602 can be hardware and/or software (e.g., threads, processes, computing devices). The system 1600 also includes one or more server(s) 1604. The server(s) 1604 can also be hardware and/or software (e.g., threads, processes, computing devices). The servers 1604 can house threads to perform transformations by employing one or more embodiments as described herein, for example. One possible communication between a client 1602 and a server 1604 can be in the form of a data packet adapted to be transmitted between two or more computer processes. The system 1600 includes a communication framework 1606 that can be employed to facilitate communications between the client(s) 1602 and the server(s) 1604. The client(s) 1602 are operably connected to one or more client data store(s) 1608 that can be employed to store information local to the client(s) 1602. Similarly, the server(s) 1604 are operably connected to one or more server data store(s) 1610 that can be employed to store information local to the servers 1604.

The above description of illustrated embodiments, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

As used herein, the word "example" is used herein to mean serving as an example, instance, or illustration. For the avoidance of doubt, the subject matter described herein is not limited by such examples. In addition, any aspect or design described herein as an "example" is not necessarily to be construed as preferred or advantageous over other aspects or designs, nor is it meant to preclude equivalent structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

In this regard, while the described subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims.

What is claimed is:

1. A system, comprising:
   a memory that stores computer executable instructions; and
   a processor that executes or facilitates execution of the computer executable instructions to at least:
   display a manager application comprising a first display of a first application utilized in configuration of an industrial automation system at a first organizational location within the manager application and a second display of a second application utilized in the configuration of the industrial automation system at a second organizational location within the manager application; and provide a common menu for use with the first application and the second application via the manager application, wherein the manager application facilitates navigation between the first application and the second application, wherein the manager application facilitates performance of an action by the first application and the second application in response to an input received by the manager application, wherein the common menu comprises a common save command for the first application and the second application, the input is a selection of the common save command, and the action performed is concurrently saving a first application instance of the first application and a second application instance of the second application in response to the selection of the common save command, wherein at least the first display of the first application is reduced in size in at least the first organizational location within the manager application in response to elimination of at least one menu of the first application based on the providing of the common menu, wherein the first application instance of the first application comprises a visualization design of a visualization portion associated with a component of the industrial automation system, and the second application instance of the second application comprises a control design of a control portion of the component of the industrial automation system, wherein the visualization portion associated with the component corresponds to the control portion of the component, and wherein visualization data, associated with the first application, a first file format, and a first type of hierarchy that is associated with the industrial automation system, is mapped to control data, associated with the second application, a second file format, and a second type of hierarchy that is associated with the industrial automation system, wherein the visualization data is associated with the visualization portion of the component and the control data is associated with the control portion of the component, and wherein the visualization data is a subset of data that is different from, and is not based on, the control data, and wherein the control data is not based on the visualization data.

2. The system of claim 1, wherein the first application instance comprises a first application instance of a visualization program of the first application, the second application instance comprises a second application instance of a control program of the second application, and another application instance of the visualization program of the first application that is different from the first application instance, and wherein the action performed further comprises concurrently saving the first application instance of the visualization program of the first application, the second application instance of the control program of the second application, and the other application instance of the visualization program of the first application in response to the selection of the common save command.

3. The system of claim 1, wherein the common menu comprises at least one of a common file menu for the first application and the second application, a common view menu for the first application and the second application or a common tools menu for the first application and the second application.

4. The system of claim 1, wherein the manager application comprises a tabbed application interface, wherein the first organizational location corresponds to a first tab and the second organizational location corresponds to a second tab.

5. The system of claim 1, wherein the common menu comprises a common visualization menu that provides a plurality of visualizations of the industrial automation system.

6. The system of claim 5, wherein the plurality of visualizations comprises at least two of a logical visualization, a physical visualization, a network visualization, or a library visualization.

7. The system of claim 1, wherein the processor executes or facilitates the execution of the computer executable instructions to utilize a drag-and-drop function to at least map the visualization data associated with the first application and the first file format to the control data associated with the second application and the second file format.

8. The system of claim 1, wherein a first instance of data is associated with the first type of hierarchy associated with the industrial automation system, and a second instance of data is associated with the second type of hierarchy associated with the industrial automation system, wherein the first instance of data and the second instance of data relate to a same item of data, and wherein the first instance of data represents a first namespace and the second instance of data represents a second namespace.

9. The system of claim 1, wherein the second display of the second application is emphasized over the first display of the first application within a main display of the manager application in response to selection of the second application to navigate to the second application, wherein the emphasis of the second display over the first display comprises at least one of an increase in size of the second display of the second application or a decrease in size of the first display of the first application, and wherein, subsequent to the emphasis of the second display, the first display, including at least a portion of the visualization data, and the second display, including at least a portion of the control data, continue to be displayed within the main display at respective sizes.

10. A method, comprising:
displaying, by a system comprising a processor, a master application comprising a first slave application utilized in configuring an industrial automation system and a second slave application utilized in the configuring of the industrial automation system;

facilitating, by the system, navigation between the first slave application and the second slave application via the master application;

receiving, by the system, input information associated with a common menu by the master application to facilitate performance of an action by the first slave application and the second slave application in response to the receiving of the input information, wherein the first slave application and the second slave application are different applications utilized in the configuring of the industrial automation system, wherein the common menu comprises a common save command to facilitate saving information for the first slave application and the second slave application, and wherein the common save command is selected in response to the input information;

decreasing, by the system, a size of at least a first display of the first slave application in connection with the displaying of the master application in response to eliminating at least one menu of the first slave application based on the common menu;

performing, by the system, the action comprising saving both a first application instance of the first slave application and a second application instance of the second slave application in response to the selecting of the common save command, wherein the first application instance of the first slave application comprises a display design of a display portion associated with a component of the industrial automation system, and the second application instance of the second slave application comprises a control design of a control portion that facilitates controlling operation of the component of the industrial automation system, and wherein the display portion associated with the component corresponds to the control portion associated with the component; and mapping, by the system, display information associated with the first slave application and a first file format to control information associated with the second slave application and a second file format, wherein the display information is associated with the display portion associated with the component, wherein the display information is associated with a first hierarchy that is associated with the industrial automation system, wherein the control information is associated with the control portion that facilitates controlling the operation of the component, wherein the control information is associated with a second hierarchy that is associated with the industrial automation system, and wherein the display information is a subset of information that is different from, and is not based on, the control information, and wherein the control information is not based on the display information.

11. The method of claim 10, further comprising selecting the action from a group comprising a save action, a view action, and an edit action.

12. The method of claim 10, wherein the first slave application is a display program and the second slave application is a control program.

13. The method of claim 10, wherein the first slave application comprises the first application instance of a program and the second slave application comprises the second application instance of the program, and wherein the first application instance of the program corresponds to a first version of the program and the second application instance of the program corresponds to a second version of the program.

14. The method of claim 10, further comprising:
displaying, by the system, the first slave application at a first position within a display of the master application and the second slave application at a second position within the display of the master application.

15. The method of claim 14, wherein the first position and the second position correspond to a first tab and a second tab within the master application.

16. The method of claim 10, wherein the master application is reusable for a different first slave application or a different second slave application.

17. The method of claim 10, wherein the master application provides the common menu to the first slave application, the second slave application, and a third slave application, and wherein the first slave application is a first version of a first program, the second slave application is a second program, and the third slave application is a second version of the first program.

18. A non-transitory machine-readable storage medium comprising computer-executable instructions stored thereon that, in response to execution, cause a system comprising a processor to perform operations, comprising:

displaying a main application comprising a first application utilized within an industrial automation system and a second application utilized within the industrial automation system, wherein a first display of the first application is located at a first position within a main display of the main application, wherein a second display of the second application is located at a second position within the main display of the main application, and wherein at least the first display of the first application is reduced in size in at least the first position within the main display of the main application in response to elimination of at least one menu of the first application based on generation of a common menu of the main application;

receiving a selection of a command from the common menu for the first application and the second application within the main application;

facilitating performance of an action by the first application and the second application in response to the receiving the selection, wherein the command is a common save command for use in connection with the first application and the second application, wherein the action performed is saving a first application instance of the first application and a second application instance of the second application in response to the selection of the common save command, wherein the first application instance of the first application comprises a visualization design of a visualization portion associated with a device of the industrial automation system, and the second application instance of the second application comprises a control design of a control portion associated with the device of the industrial automation system, and wherein the visualization portion associated with the device corresponds to the control portion associated with the device; and mapping visualization data associated with the first application and a first file format to control data associated with the second application and a second file format, wherein the visualization data is associated with the visualization portion associated with the device, wherein the visualization data is associated with a first hierarchy that is associated with the industrial automation system, wherein the control data is associated with the control portion associated with the device, wherein the control data is associated with a second hierarchy that is associated with the industrial automation system, and wherein the visualization data is a subset of data that is different from, and is not based on, the control data, and wherein the control data is not based on the visualization data.

19. The non-transitory machine-readable storage medium of claim 18, wherein the first application is a first program and the second application is an earlier version of the program or a different program.

20. The non-transitory machine-readable storage medium of claim 18, wherein the main application is reusable for a third application or a fourth application, wherein the third application is different from at least one of the first application or the second application, and wherein the fourth application is different from at least one of the first application or the second application.

* * * * *